United States Patent [19]
Finnegan et al.

[11] 3,766,841
[45] Oct. 23, 1973

[54] METHOD AND APPARATUS FOR EXTENDING THE EXPOSURE RANGE FOR CAMERA LENSES

[75] Inventors: Frank Henry Finnegan, Van Nuys; Karl Heinz Gensike; Robert Clayton Marsh, both of Los Angeles, all of Calif.

[73] Assignee: Dymat Photomatrix Corporation

[22] Filed: Dec. 1, 1972

[21] Appl. No.: 311,441

[52] U.S. Cl................ 95/64 R, 95/64 D, 352/141
[51] Int. Cl......................... G03b 9/02, G03b 11/00
[58] Field of Search............... 95/64 R, 64 D, 10 C; 352/141

[56] References Cited
UNITED STATES PATENTS 3,584,558   6/1971   Easterly ............................ 352/141
3,057,279   10/1962   Angenieux ......................... 95/64 D Primary Examiner—Samuel S. Matthews
Assistant Examiner—Russell E. Adams, Jr.
Attorney—Pastoriza & Kelly

[57] ABSTRACT

The exposure range of a camera lens is extended by positioning a light filter in front of the lens when the amount of light passing into the lens is greater than a given amount of light for which the lens stop would be set at its maximum limit. The filter functions to attenuate the light such that the lens may be set at a proper opening within the stop value range. The filter is removed from in front of the lens when the amount of light passing through the lens is less than a second given amount of light for which the lens stop would be set at its minimum limit. If the filter attenuates the light by at least three stops, the exposure range of the lens is effectively extended by at least three stops.

3 Claims, 5 Drawing Figures

METHOD AND APPARATUS FOR EXTENDING THE EXPOSURE RANGE FOR CAMERA LENSES

This invention relates generally to camera lenses and more particularly to a method and device for extending the exposure range of a camera lens used with a television camera.

BACKGROUND OF THE INVENTION

Silicon diode tube television cameras are very sensitive to low light conditions which makes them ideal for surveillance work. However, a silicon diode tube does not incorporate an automatic gain control system as does a Vidicon tube. The regulation of the exposure is therefore done at the lens through a lens iris. In this respect, it is desirable to use the standard camera lenses. The advantage of using the standard camera lens is the ready availability of such lenses and the high quality available for reasonable cost.

Because of the extreme low light sensitivity of the tube, a standard camera or taking lens does not provide a large enough exposure range or f/stop scale to control high light levels as encountered on a bright sunny day. When an automatic exposure control system is provided on the camera for automatically varying the size of the lens iris in response to the light received, the automatic control will simply fail to function where the amount of light being received by the lens is greater than that amount of light for which the maximum lens stop is set by the control. If the incoming light could be attenuated when it is brighter than the lens can adjust to by its normal stop scale range, then the automatic exposure control could continue to function, the attenuation of the light being such as to bring it back within the exposure range of the lens.

One type of automatic exposure control system for a variable iris type lens is shown and described in U.S. Pat. No. 3,533,347.

BRIEF DESCRIPTION OF THE PRESENT INVENTION

The present invention contemplates a method and apparatus for extending the exposure range of a standard camera lens equipped with an automatic exposure control system to the end that it may readily be used with silicon diode tube type television cameras.

More particularly, the method of the invention comprises the positioning of a light filter in front of the lens in response to the amount of light passing into the lens being greater than a given amount of light for which the lens stop would be set at its maximum limit, the filter functioning to attenuate the light such that the lens may be set at a proper opening by adjusting the lens stop to a given stop value within the range of the stop limits. The method may also include the step of removing the filter from in front of the lens in response to the amount of light passing through the filter being less than a second given amount of light for which the lens stop would be set at its minimum limit.

The design of the filter may be such that the given stop value at which the lens is set when the filter is positioned in front of the lens is at least three stops below the maximum limit whereby the exposure range of the lens is effectively extended by at least three stops.

In a preferred embodiment of the invention, a neutral density filter is used which attenuates the light by five stops so that actually an extension of five stops is provided for the lens.

The preferred device for carrying out the method of the invention comprises a filter and a mounting means for the filter responsive to rotation of the lens ring which, in turn, is controlled by the automatic exposure control system, rotation of the lens ring changing the iris size of the lens. Thus, the filter is moved to a first position in front of the lens in response to rotation of the lens ring to a point at which the maximum stop is set for the lens. The filter is removed from in front of the lens to a second position when the lens ring is rotated in an opposite direction to a point at which the minimum stop is set for the lens when the filter is in front of the lens.

A feature of the invention resides in the provision of two over-center spring arrangements which cooperate together to effectively "flip" the filter between its first and second positions so that any interruption or discontinuity in the proper exposure set by the automatic exposure control means is minimized.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
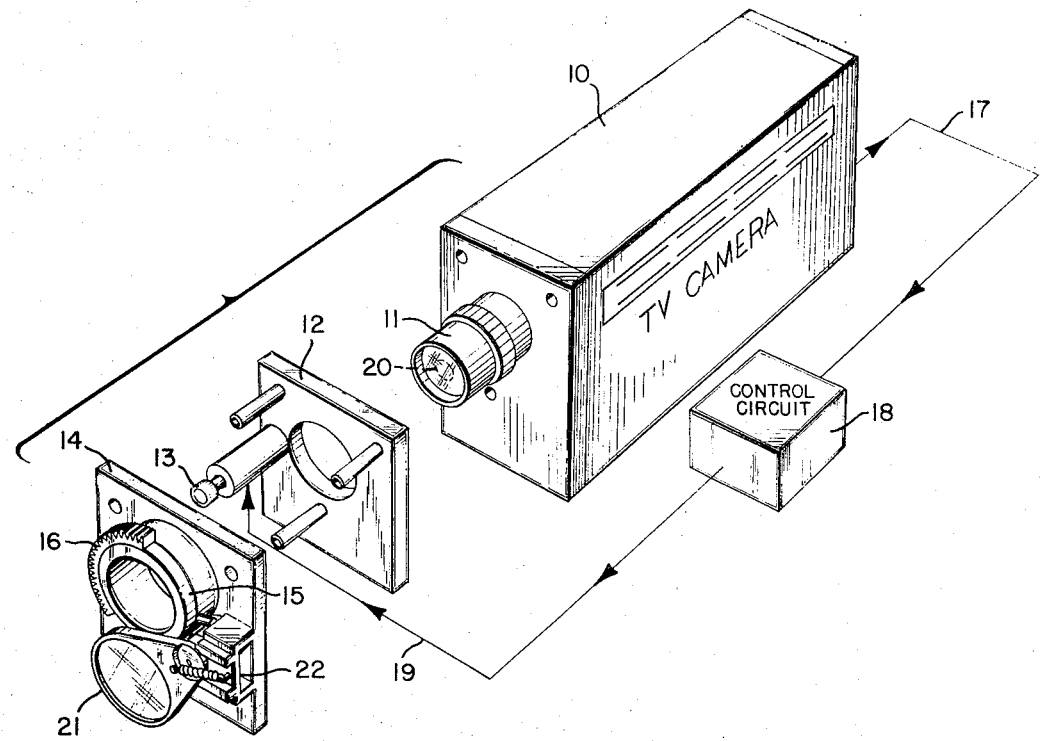
FIG. 1 is an exploded perspective view of a typical silicon diode tube television camera used for surveillance work provided with automatic exposure control and means for extending the exposure range of its lens in accord with the present invention.

Referring first to FIG. 1, there is shown a television camera 10 of the silicon diode tube type which is very sensitive to low light conditions and which is thus ideal for surveillance work. The camera 10 is provided with a standard camera lens 11 having given maximum and minimum f/stop limits, the lens exposure being controlled by rotating the lens to vary the size of an iris in the lens.

An automatic exposure control for the camera lens includes a mounting 12 supporting a drive servo motor 13 cooperating with a mounting plate 14 having an opening for the lens. When the components are assembled, a lens ring 15 is secured to the lens 11 to rotate the same.

As shown, the lens ring 15 includes a sector gear 16 arranged to cooperate with the servo motor 13 when the parts are assembled. The arrangement is such that the rotational position of the lens and thus the amount of light passing into the camera is responsive to variations in the light to maintain a correct exposure relationship. Thus, a video signal which is a function of the amount of light entering the TV camera is provided on a lead 17 passing to a control circuit 18, in turn providing a servo signal to the motor 13. When the light increases, the resulting signal on the lead 17 actuates the control circuit 18 to provide a signal on 19 to the servo motor to rotate the lens in that direction to cut down the amount of light transmitted. The decreased light thus diminishes the signal on lead 17 until a balanced condition is obtained. If the incoming light decreases, the motor operates in an opposite direction to open up the lens until a balanced condition is obtained.

The lens iris opening controlled by rotation of the lens ring 15 is indicated by the dashed circle 20 in the lens 11 of FIG. 1. To extend the exposure range of the lens 11, the mounting plate 14 includes a filter holder 21 having an off-center arm pivoted on the mounting plate 14 next to a bracket means indicated by the numeral 22.

Figure 2:
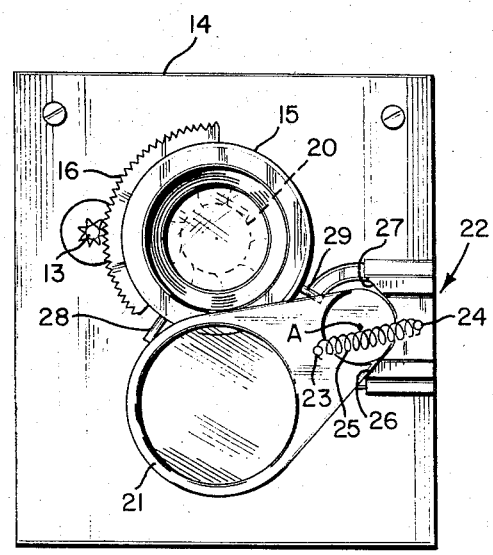
FIG. 2 is a front elevational view of the camera of FIG. 1 with the exploded components shown in assembled relationship and wherein a filter component is shown in a second position removed from in front of the lens.

Referring specifically to FIG. 2, it will be noted that the filter holder is mounted for pivoting movement about an axis A spaced from and parallel to the axis of the lens. A securing point 23 positioned between the filter and pivot axis A and a stationary pin 24 connect to the ends of a filter holder over-center spring 25. The stationary pin 24 is connected to the bracket 22 on the opposite side of the pivot axis A from the point that the spring connects to the filter pin point 23. Engaging means 26 and 27 on the bracket 22 limit the pivoting movement of the lens holder 21 to positions removed from or in front of the lens.

In FIG. 2, the axis of the spring 25 is to the lower side of the pivot axis A so that the filter holder 21 is biased by the over-center spring 25 to its position removed from in front of the lens wherein it is engaged at 26 by the engagement means of the mounting 22.

Figure 3:
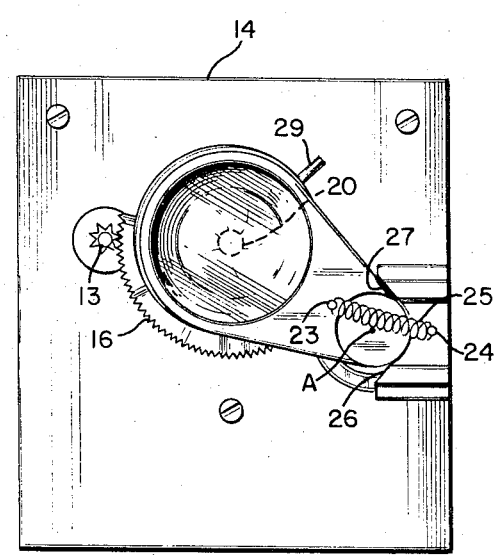
FIG. 3 is a view similar to FIG. 2 but showing the filter component in a first position in front of the lens.

Referring to FIG. 3, the filter holder is shown in a first position in which the filter is in the light path in front of the lens and wherein the over-center spring 25 is above the pivot axis A to bias the holder to this first position, proper positioning being assured by engagement of the filter holder with the mounting at 27.

Essentially, the filter holder over-center spring 25 functions to positively hold the filter in its first position in front of the lens or in its second position removed from in front of the lens.

In accord with the present invention, the lens ring 15 is provided with radially extending circumferentially spaced first and second actuating pins 28 and 29. An actuator means mounted on the plate 14 behind the filter holder arm is engaged by the first and second actuating pins upon rotation of the lens ring 15 in first and second directions, respectively, to move the filter holder between the first and second positions illustrated in FIGS. 3 and 2, respectively.

Figure 4:
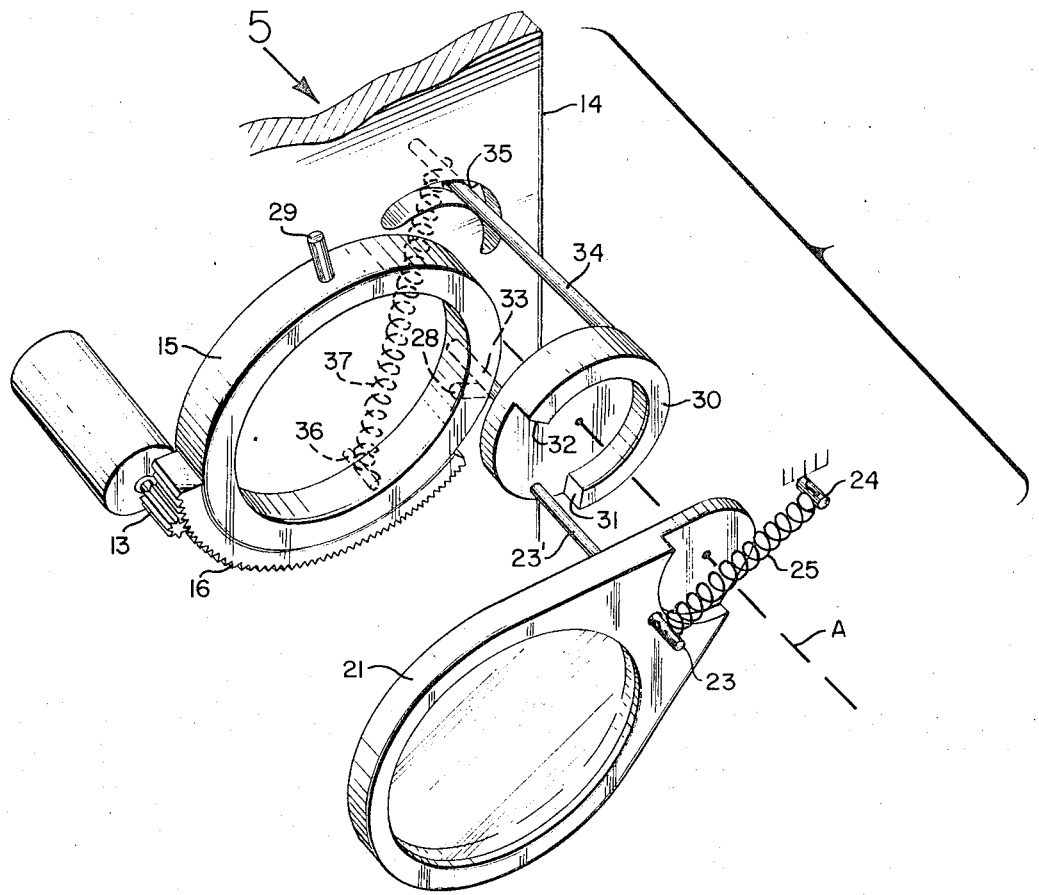
FIG. 4 is a fragmentary exaggerated exploded view of certain basic components useful in explaining the operation of the invention.
Figure 5:
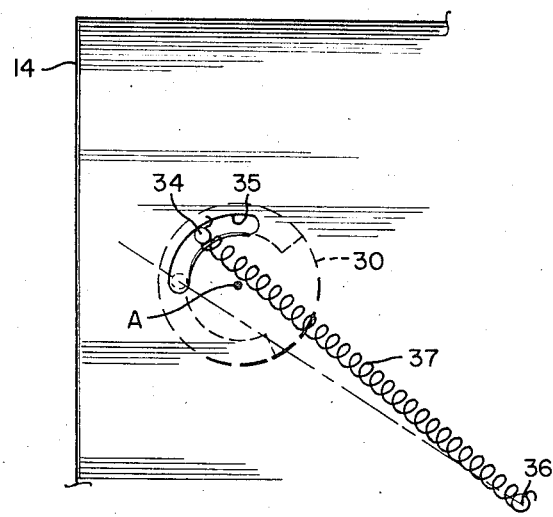
FIG. 5 is a fragmentary rear elevational view looking in the direction of the arrow 5 of FIG. 4.

Referring now to FIGS. 4 and 5, this actuator means will be described in detail.

In FIG. 4, it will be noted that the pin 23 at the point at which one end of the over-center spring 25 is secured extends through the back of the filter holder 21 as indicated at 23' an actuator ring 30 is mounted behind the filter arm for rotation about the pivot axis A and includes circumferentially spaced first and second shoulders 31 and 32 the relative positioning with respect to the filter holder being such that the pin 23' extends between these shoulders for engagement thereby upon rotation of the actuator ring 30. An actuator pin 33 secured to the ring 30 extends to a position for engagement by one or the other of the actuating pins 28 and 29 on the lens ring 15. A further pin 34 secured to a peripheral rear portion of the actuator ring 30 extends through an arcuate slot 35 on the mounting plate 14. The length of this pin is greatly exaggerated for purposes of clarity in view of the exploded relationship of the components shown.

Referring to FIG. 5, there is provided a stationary anchoring point 36 on the back of the plate 14. An actuator ring over-center spring 37 connects to the extending end of the pin 34 from the slot 35 and the anchoring point 36. In the position illustrated in FIG. 5, it will be noted that the axis of the over-center spring 37 is slightly to the right and above the pivot axis A.

OPERATION

In operation, and referring once again to FIGS. 1, 2 and 3, the automatic exposure control means for the camera lens 11 automatically drives the lens ring 15 by means of the servo motor 13 to provide given correct exposures in response to the amount of light passing through the lens. The driving motion imparted to the lens ring 15 in turn actuates the mounting means for the filter holder automatically to move the filter to a first position in front of the lens when the amount of light exceeds that amount for which the lens is set at its maximum stop. When the incoming light through the filter in front of the lens falls below the minimum amount for which the lens is set at its minimum stop, the driving motion imparted to the lens ring actuates the mounting means to remove the filter from in front of the lens to its second position.

Assuming that a neutral density filter equivalent to five stops is used, and assuming that the normal maximum and minimum lens stops for the lens 11 are $f$-22 and $f$-1.9, the filter assumes its first position shown in FIG. 3 when the amount of light entering the lens exceeds that given amount for which the lens stop would be set at $f$-22. When the filter flips to its first position in front of the lens, the light is attenuated quickly such that the signal on the lead 17 in FIG. 1 drives the servo motor through the control circuit 18 to immediately open up the iris 20 of the lens in view of the diminished transmitted light to a proper given lens stop setting for the actual amount of light received. Preferably, and as stated heretofore, the new stop setting will be about five stops below the maximum setting of $f$—22; for example, the lens iris would be opened up to an $f$/stop of $f$-4. This action results from the lens ring being rapidly rotated to the $f$-4 setting by the servo motor. The automatic exposure control can now continue to operate up to the maximum $f$/stop of $f$-22 for light passing through the filter, and thus the effective range of exposure of the lens is increased by five stops.

When the light passing through the filter falls below a given amount of light for which the lens is set at its minimum stop; for example, $f$-1.9, the position of the lens ring is such as to actuate the mounting means for the filter holder to remove the filter to its second position shown in FIG. 2. The sudden increase in light received through the lens will then actuate the automatic exposure control servo motor to rapidly rotate the lens to a new $f$/setting five stops above the minimum stop; for example, $f$-11. A continued decrease in the amount of light passing through the lens will result in further opening of the iris by the automatic exposure control, the control functioning in the usual manner within the stop limits of the lens until such time as the amount of light received exceeds the maximum stop of, for example, f–22.

It will be evident from the foregoing that the movement of the filter between its first and second positions can thus be easily controlled by the position of the lens ring in turn controlled by the automatic exposure control.

In order that a rapid movement of the filter holder takes place between its first and second position, the actuator ring over-center spring described in FIG. 5 is used.

This action for assuring "flipping" or rapid movement of the filter holder will now be described with reference to FIGS. 4 and 5.

FIG. 4 shows the filter holder in its second position; that is, removed from in front of the lens, the lens ring itself approaching its maximum stop by rotation of the servo motor 13. Assuming that the light is increasing beyond the amount for which the lens would be set at its maximum stop, the actuating pin 28 on the lens ring 15 engages the actuator pin 33 to start rotating the actuator ring 30. This rotational movement of the actuator ring 30 causes the over center-spring 37 of FIG. 5 to approach the over-center position. When the lens stop reaches its maximum limit, the over-center spring 37 is just passing its over-center position; that is, beyond the pivot axis A so that it will now tend to rapidly rotate the actuator ring 30 in its direction of motion. At this point, the shoulder 31 engages the filter holder 23' to flip the filter holder to its first position wherein the filter is in front of the lens, the filter holder overcenter spring 25 assuring that the filter will remain in this position until the filter holder is actuated in an opposite direction.

If now the incoming light through the filter decreases so that the amount of light in the camera corresponds to the minimum stop or widest open position in the iris, the actuator ring approaching this limit is rotating in an opposite direction so that the actuating pin 29 will engage the actuator pin 33 to rotate the actuator ring 30 in an opposite direction. The over-center spring 37 of FIG. 5 will then move up and just as it is ready to pass over the center pivot axis A, the shoulder 32 engages the filter holder pin 23' and, actual passing over of the over-center spring 37 results in a rapid rotation of the actuator ring 30 thereby flipping the filter holder from its first to its second position out of the ways of the lens.

It will be appreciated from the foregoing that by the use of the actuator ring 30 so designed that the shoulder portions will only engage the filter pin 23' when the over-center spring 37 is just ready to pass over center, a rapid flipping action of the filter holder takes place so that any interruption or discontinuity in the exposure level as controlled by the automatic exposure means as a consequence of movement of the filter between its first and second positions is minimized.

From the foregoing description, it will be evident that the present invention has provided a simple and economical method and device for effectively extending the exposure range of a camera lens.

The lens in the embodiment described has a range of seven stops so that the filter is designed to attenuate the light through five stops. In general if the lens has a greater or lesser number of stops the filter preferably has two less the number of lens stops. In otherwords, the filter will attenuate the light an amount such that the lens resets at a given stop two stops above its minimum stop. By such a design, it is assured that the lens stop can be readjusted within its range to the new stop value resulting immediately after the filter is positioned in front of the lens.

Thus, while the invention has been described with respect to a television camera lens used for surveillance work, the principles of the present invention are clearly applicable to any camera lens to enable automatic control of proper exposure wherein lighting conditions are beyond that which can be accomodated by the standard lens.

What is claimed is:

1. A device for extensing the exposure range of a camera lens having given maximum and minimum stop limits wherein the lens opening defining the lens exposure is controlled in size by rotation of a lens ring on the lens, said device including:
   a. a filter;
   b. mounting means for said filter responsive to rotation of the lens ring to a point at which the maximum stop is set for the lens to move said filter to a first position in front of the lens and responsive to rotation of the lens ring in an opposite direction to a point at which the minimum stop is set for the lens when said filter is in front of the lens, to remove said filter from in front of the lens to a second position, said mounting means for said filter including a stationary mounting plate through which the lens ring extends; radially extending circumferentially spaced first and second actuating pins on said lens ring; a holder for said filter having an off-center arm pivoted on the mounting plate for moving the filter between said first and second positions about an axis spaced from and parallel to to the axis of the lens; engaging means on the plate to limit the movement of the filter holder beyond the first and second positions; a filter holder over-center spring connected at one end to the holder at a point between the filter and said pivot axis and at its other end to a stationary point on the plate on the opposite side of the pivot axis so that the filter holder is biased by the spring to hold the filter in either its first or second position; and,
   c. actuator means mounted on said plate in a position to be engaged by said first and second actuating pins upon rotation of the lens ring in first and second directions respectively to move said filter holder between said first and second positions.

2. A device according to claim 1, including, in combination automatic exposure control means for said camera lens for automatically driving said lens ring to provide given correct exposures in response to the amount of light passing through the lens, said driving motion imparted to the lens ring actuating the mounting means automatically when the incoming light exceeds that amount for which the lens is set at its maximum stop and when the incoming light through the filter falls below the minimum amount for which the lens is set at its minimum stop.

3. A device according to claim 1, in which said actuator means includes an actuator ring rotatably mounted on said pivot axis having circumferentially spaced first and second shoulders; a filter holder pin extending from said filter holder to a position between said shoulders for engagement thereby upon rotation of said actuator ring; an actuator pin on said actuator ring positioned to be engaged by said first and second actuating pins on said lens ring when said lens ring is rotated in said first direction and said second direction respectively; and an actuator ring over-center spring connected at one end to a peripheral portion of the actuator ring and at its other end to a stationary point on the plate spaced on the opposite side of the pivot axis, whereby as said lens ring is rotated towards said point at which the maximum stop is set for the lens, said first actuating pin engages said actuator pin to rotate said actuator ring to bring the first shoulder into engagement with the filter holder pin, the actuator ring spring then passing over-center to drive the actuator ring rapidly in its rotational movement to flip the filter holder to said first position to place the filter in front of the lens, and whereby when said lens ring is rotated in an opposite direction towards said point at which the minimum stop is set for the lens, said second actuating pin engages said actuator pin to rotate said actuator ring in an opposite direction to bring the second shoulder into engagement with the filter holder pin, the actuator spring then passing back over-center to drive the actuator ring rapidly in its rotational movement to flip the filter holder to its second position to remove the filter from in front of the lens.

* * * * *